June 7, 1949.  C. E. DENNIS  2,472,096
RADIO-FREQUENCY TESTING CIRCUIT
Filed March 1, 1946
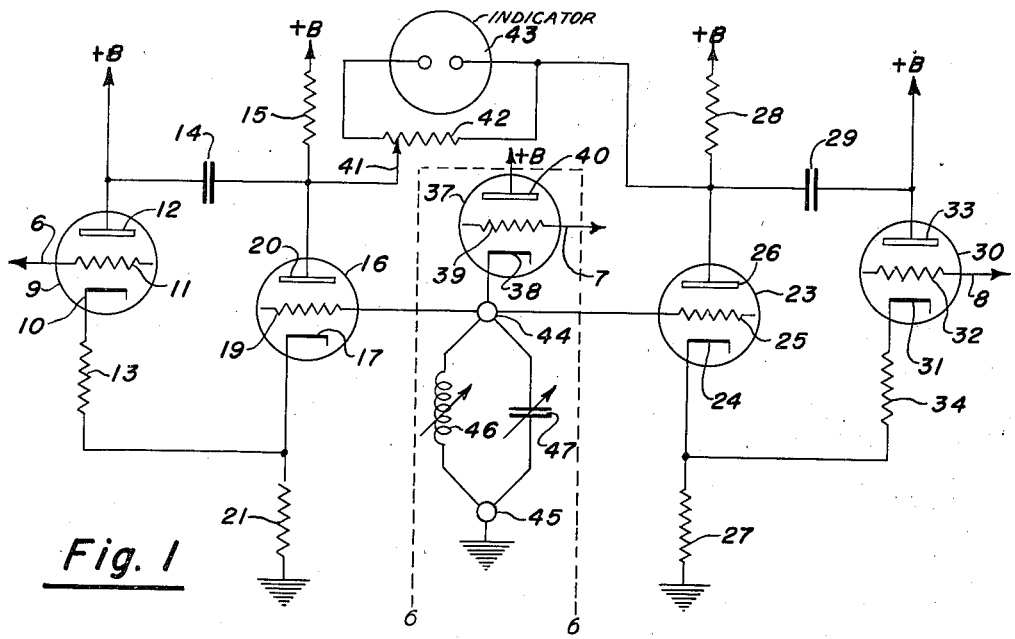
Fig. 1
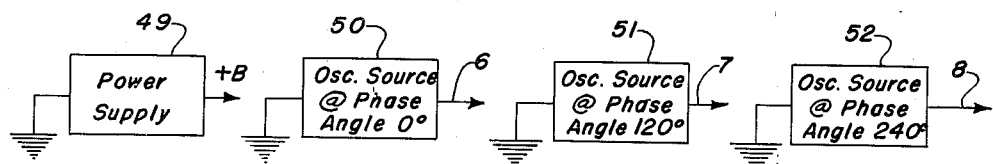
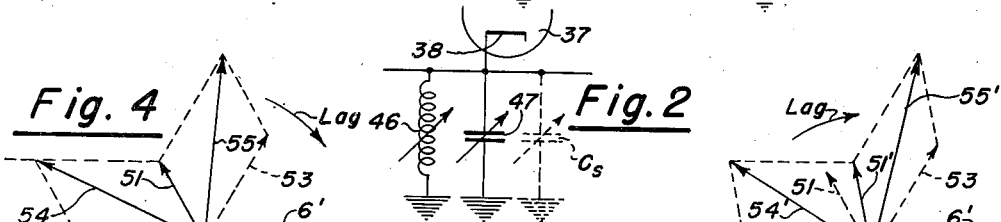
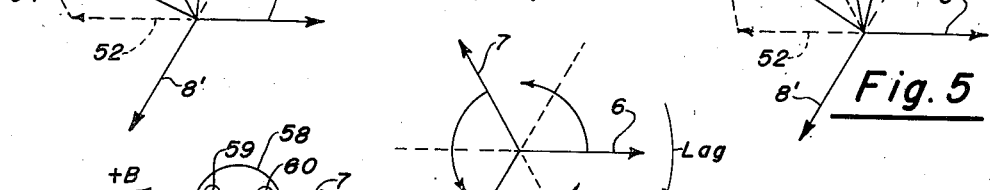
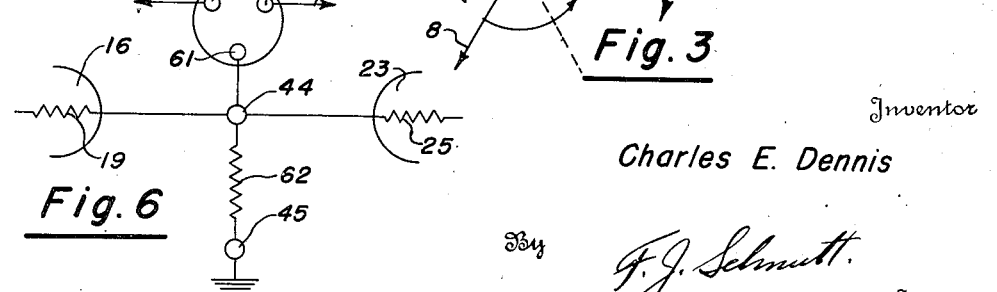
Inventor
Charles E. Dennis
By F. J. Schmitt
Attorney Patented June 7, 1949

2,472,096

UNITED STATES PATENT OFFICE 2,472,096

RADIO-FREQUENCY TESTING CIRCUIT

Charles E. Dennis, United States Navy

Application March 1, 1946, Serial No. 651,415

7 Claims. (Cl. 175—183)

(Granted under the act of March 3, 1883, as amended April 30, 1928; 370 O. G. 757)

This invention relates to a radio-frequency testing circuit, and more particularly to that type of testing circuit that indicates the deviation of frequency-sensitive electrical elements from a predetermined standard.

The primary object of this invention is to provide a radio-frequency testing circuit which will rapidly produce accurate indications of the magnitude and direction that audio and radio frequency coils, condensers, and materials, such as mica, paper, etc., deviate from predetermined electrical standards.

A further object of this invention is to provide a radio-frequency testing circuit which will rapidly produce accurate indication of the magnitude that the interelectrode capacitances of vacuum tubes differs from those of a prescribed standard tube.

Another object of this invention is to provide a radio-frequency testing circuit that utilizes three oscillating voltages, each 120° out of phase with the other but of equal voltage amplitude and of the same selected frequency.

Another object of this invention is to provide a radio-frequency testing circuit that will require personnel engaged in operating the device to make only an initial adjustment in order to make a desired series of tests.

A further object of this invention is to provide a testing device of the variety described of simple design in which the circuit elements are limited to condensers, resistors, and electronic tubes, and in which no inductances are required.

Other objects and improvements over prior art will be apparent from the following description.

Reference is now made to the accompanying drawings in which

Fig. 1 is a circuit diagram of the radio-frequency testing device;

Fig. 2 is a diagram of a network which may be tested by this invention;

Fig. 3 is a vector diagram representing the input voltages required;

Fig. 4 is a vector diagram showing voltage amplitude and phase relationships of various voltages present in the invention during a described condition of operation;

Fig. 5 is another vector diagram of voltages present in the invention during another described condition of operation; and Fig. 6 is an alternative form of the test terminal arrangement shown in Fig. 1 taken within line 6—6.

The invention comprises three vacuum tubes connected as cathode followers, each of which are fed a single phase of the three required oscillating voltages of 120° phase difference. The source of the oscillating voltages may be a common source providing the three required outputs, or may be individual sources providing the desired oscillating voltages. Each of two of these cathode follower tubes cathode couples the voltage impressed on its grid to two tubes connected as amplifiers respectively, while the third cathode follower tube cathode couples the voltage impressed on its grid to both of the amplifier tubes. The elements whose characteristics are to be determined are connected in the cathode circuit of the third cathode follower tube. It is here pointed out that the oscillating voltages fed to the first two cathode follower tubes may have any phase relationship provided their amplitudes are equal and provided the phase angle of the third oscillating voltage bisects the phase angle formed by the first two oscillating voltages. It is also not necessary that the third oscillating voltage be equal in amplitude to the first two oscillating voltages. The forthcoming analysis will apply only to the specific case wherein the three oscillating voltages are of equal amplitude and phase; however, an analysis applicable to any three oscillating voltages meeting the requirements stated above will parallel this forthcoming analysis. The deviation of the element under test from a predetermined standard produces a phase shift in the common voltage that is cathode coupled to both amplifier tubes. This phase shift will cause unequal currents to flow in the amplifier tubes causing a deflection of a direct-current indicator connected for differential action between the plates of the two amplifier tubes. Proper adjustment of a shunting potentiometer across this direct-current indicator to provide the proper sensitivity will produce deflections to indciate percentage deviation from standard as read from a previously calibrated scale of the indicator.

In the embodiment of Fig. 1 it is shown that the radio-frequency testing device consists generally of the vacuum tubes 9, 16, 23, 30 and 37 in addition to the associated circuits. The five vacuum tubes shown herein in the form of triodes may have any number of elements; and it is to be understood that this invention is not to be limited to tubes of the triode classification. The grid 11 of the tube 9 is connected to the zero-phase voltage 6 of the oscillating source 50. The plate 12 is connected directly to the positive terminal of a high voltage, direct-current plate voltage supply 49. The load resistance for the tube 9 is the series combination of resistors 13 and 21 connected between the cathode 10 and ground, the junction between the two resistors being connected to the cathode 17 of the tube 16. The plate 20 is connected to the power supply 49 through the load resistor 15. A condenser 14 connecting the two plates 12 and 20 provides a radio-frequency path to ground for the plate 20. In a like manner, the grid 32 of the tube 30 is connected to the 240° phase voltage 8 of the oscillating source 52. The plate 33 is connected directly to the positive terminal of the power supply 49. The load resistance for the tube 30 comprises the series combination of resistors 27 and 34 connected between the cathode 31 and ground, the junction between the two resistors being connected to the cathode 24 of the tube 23. The plate 26 is connected to the positive terminal of the power supply 49 through the resistor 28, the plate 26 being also connected to the plate 33 by means of a condenser 29 acting as a radio-frequency by-pass to ground. The grid 39 is connected to the 120° phase voltage 7 of the oscillating source 51, the plate 40 being directly connected to the positive terminal of the power supply 49. A test terminal 44 is provided at the cathode 38, and a second test terminal 45 is provided at ground potential. The test terminals 44 and 45 are provided for the insertion of the radio-frequency elements to be tested 46 and 47, thereby providing the return circuit for the cathode 38. The radio-frequency elements under test, shown in the embodiment as a tuned circuit composed of the coil 46 and condenser 47 are connected between ground and a common junction connecting the two grids 19 and 25 with the cathode 38. The plate 20 is connected to an arm 41 of the potentiometer 42 which is connected across the terminals of a direct-current indicator 43, whereas the plate 26 is connected directly to one terminal of the indicator 43, thereby connecting said indicator 43 for differential action.

In operation, the cathode circuits of the tubes 9 and 30 provide cathode coupling of the voltages 6 and 8 to the tubes 16 and 23 respectively. The phase relationship of the voltage on the cathode 38 of the tube 37 to the voltage on the grid 39 will depend on the relationship of the resonant frequency of circuit under test with the frequency of the oscillating voltage 7 on the grid 39. The voltage on the cathode 38 is cathode coupled to the grids 19 and 25. The tubes 16 and 23 then vectorially subtract the oscillating voltages 6 and 8 from the voltage on the cathode 38. The resulting grid-to-cathode voltages on the tubes 16 and 23 control the plate current of these tubes, thereby varying the direct-current voltage at the plates 20 and 26. This difference in voltage on the plates 20 and 26 cause the direct-current indicator 43 to deflect, indicating the characteristics of the elements under test.

More specifically, the oscillating voltage 6 shown as a vector 6 in Fig. 3 maintains its phase relationship as it appears on the cathode 17. This voltage appearing on the cathode 17 is represented by a vector 6' in Fig. 4 and Fig. 5. Similarly, the oscillating voltage 8 shown as a vector 8 in Fig. 3 maintains its phase relationship as it appears on the cathode 24 and is represented by a vector 8' in Fig. 4 and Fig. 5. The voltage thus impressed on the cathodes 17 and 24 cause a direct current to flow through the tubes 16 and 23 and through their respective load resistors 15 and 28, the oscillating components of this direct current being filtered out by the radio-frequency by-pass condensers 14 and 29 to ground. The magnitude of these direct currents will be dependent upon the characteristics of the particular vacuum tubes employed. In the absence of other signals applied to the tubes 16 and 23, the plate currents in both tubes will be equal, thereby causing equal voltage drops across their respective load resistors 15 and 28. The voltages on the plates 20 and 26 will therefore be equal and no current will flow between them, causing the indicator 43 to remain at its mid-zero position. If the inductance 46 and the condenser 47 of Fig. 1 are the standardizing elements and their impedances adjusted so as to make the parallel combination resonate at the selected frequency of oscillation of the voltage sources 50, 51 and 52, the impedance of the parallel combination of inductance 46 and condenser 47 will be non-reactive and the voltage on the cathode 38 will be in phase with the voltage 7 applied to the grid 39. This voltage on the cathode 38 is represented by a vector 51 in Fig. 4. The effective grid 19 to cathode 17 voltage of the tube 16 will be the vector difference between the voltage on the grid 19 and the voltage on the cathode 17; as according to Fig. 4, the vector difference between vector 51 and vector 6' respectively. This vector difference is equivalent to the vector summation of the vector 51 and vector 52 which is equal in amplitude but opposite in direction to the vector 6'. The resulting grid 19 to cathode 17 voltage is now represented by a vector 54. Similarly, the effective grid 25 to cathode 24 voltage of the tube 23 will be the vector difference between the voltage on the grid 25 and the voltage on the cathode 24; as according to Fig. 4, the vector difference between vector 51 and vector 8' respectively. This vector difference is equivalent to the vector summation of the vector 51 and a vector 53 which is equal in amplitude but opposite in direction to the vector 8'. The resulting grid 25 to cathode 24 voltage is now represented by the vector 55. Thus it can be seen that when the elements of standardization are non-reactive, the vector 51 remains 120° from both vectors 6' and 8', and the vectors 54 and 55 will be equal. This condition will cause equal direct currents to flow in the tubes 16 and 23, equal drop across their respective load resistors 15 and 28, and hence, equal voltages to be present on the plates 20 and 26. The equal voltages on the plates 20 and 26 will cause no deflection of the indicator 43 connected between the two plates 20 and 26, and the indicator needle will remain at its mid-zero position indicating standardization.

When the elements under test are substituted for the standardizing elements, any deviations of the tested elements from standard will result when the impedance of the tested elements is reactive. This reactive impedance may be either capacitive or inductive reactance; and the capacitive reactance condition will be considered first. Since the current through the tube 37 is the same current that flows through the capacitive impedance in the cathode circuit of the tube 37, the phase shift between the current and the voltage in a capacitive circuit will be observed to a shift of the voltage appearing across the tested elements in a lagging direction. This shift is represented in Fig. 5 by the vector 51' rotated from vector 51 of Fig. 4 in a clockwise direction, indicating a voltage lag. The effective grid-to-cathode voltages of the tubes 16 and 23 will now be the vector summations of the vector 52 with the shifted vector 51' and of the vector 53 with the shifted vector 51' respectively. The resulting vectors 54' and 55' thus produced can be seen to be unequal in amplitude thus causing unequal currents to flow in the tubes 16 and 23 and their respective load resistors 15 and 28. Resulting from this condition, unequal voltages will appear on the plates 29 and 26, whereby the indicator 43 will be caused to deflect in one direction from its mid-zero position. When the circuit under test is inductive, the vector 51' will lead the non-reactive vector 51 of Fig. 4, a similar inequality of plate voltages on the tubes 16 and 23 exists, and the indicator 43 will again be caused to deflect but in the opposite direction from its mid-zero position.

For calibration of the indicator, the standardizing elements are again placed in the cathode circuit of the tube 37. The frequency of the oscillating sources 50, 51 and 52 is shifted a known percentage, and the potentiometer 42 is adjusted thereby altering the sensitivity of the indicator 43 until the indicator 43 reads the same percentage on the calibrated scale. For greater accuracy in calibration, the frequency of the oscillating sources 50, 51 and 52 may be shifted the same percentage in the opposite direction, actuating the indicator 43 in the opposite direction. If necessary, readjustment can then be made with the potentiometer 42 to obtain a deflection corresponding to the known percentage frequency deviation. The oscillating source is readjusted to the original frequency whereupon the meter should read at its mid-zero position. Test elements can now be substituted for the standardizing elements, and the amount and direction of the deviation can now be read directly from the calibrated scale.

The numerous uses of this invention will be apparent to those skilled in the art. For example, in Fig. 2, a condenser Cs, used as a standardizing condenser, can be connected in parallel with the variable elements 46 and 47. Proper adjustment of inductance 46 and/or capacitance 47 can bring the entire parallel circuit to resonance as indicated by a mid-zero reading of the indicator 43. Other questionable condensers can be substituted for Cs and a series of tests made, each test providing the necessary information regarding magnitude and direction of deviation of the tested condenser. Using a technique paralleling that used to calibrate the indicator 43 for percentage deviation, the potentiometer 42 can be adjusted to obtain frequency or capacitive deviations on the pre-calibrated scale of the indicator 43. It is apparent that inductances can be tested in a similar manner. Use can be made of this invention in testing dielectrics by the introduction of dielectric materials in the testing circuit to be tested against a standard dielectric used for standardization of the resonant circuit and the meter circuit calibration.

A further use can be made of the testing circuit for comparing the amount of interelectrode capacitance of any vacuum tube with a standard vacuum tube. In the modification of Fig. 6, which is a diagram of a portion of the diagram of Fig. 1 contained within the broken line 6—6, is shown a test terminal means 58 containing separate terminals 59, 60 and 61 to receive the plate, grid, and cathode prong connections, respectively, of a vacuum tube. A non-reactive impedance 62 inserted between the test terminals 44 and 45, and the vacuum tube to be used as a standard of comparison is inserted in the test terminal means 58. The amount of deviation is read on the indicator 43. The tubes to be tested are now inserted to replace the standard tube. The readings taken from the indicator 43 for the various tubes inserted indicate the relative deviation of the interelectrode capacitance of the tubes under test when compared with the reading obtained with the standard tube inserted in the test terminal 58.

The cited examples are some of the uses of this invention, and those skilled in the art will be able to adopt many other usages.

The invention described herein may be manufactured and used by or for the Government of the United States of America for governmental purposes without the payment of any royalties thereon or therefor.

What is claimed is:

1. In a radio-frequency testing circuit, the combination comprising a pair of amplifying tubes each having a cathode, a control grid, and a plate circuit; a pair of vacuum tubes each having a cathode, a grid, and a plate, the cathodes of said vacuum tubes being resistance coupled to the cathodes of said amplifying tubes, respectively; a direct-current indicator connected between said plate circuits and responsive to the difference in currents therein; a third vacuum tube having a plate, a grid, and a cathode connected to the grids of said amplifying tubes; a source of three alternating voltages of the same frequency and two having the same amplitude, the third voltage having a phase angle which bisects the phase angle between the said two voltages; means for feeding the said two voltages to the grids of said pair of vacuum tubes, respectively; means for feeding the third voltage to the grid of said third vacuum tube; and test terminals in series with the plate to cathode circuit of said third vacuum tube adapted for connecting thereacross an impedance network to be tested.

2. The apparatus as set forth in claim 1 in which the source of the three alternating voltages provides voltages all of the same frequency and the same amplitude.

3. The apparatus as set forth in claim 1 in which the three alternating voltages are 120° phase-related.

4. The apparatus as set forth in claim 1 in which the source of the three alternating voltages provides voltages all of the same frequency and the same amplitude, and said three voltages being 120° phase-related.

5. The apparatus as set forth in claim 1 and sensitivity adjusting means for the direct current indicator.

6. In a testing circuit, a pair of vacuum tubes each having a cathode, a grid, and a plate circuit, a direct-current indicator connected between said plate circuits and responsive to the difference in currents therein, a third vacuum tube having a grid, and a cathode connected to the grids of said pair of tubes, a source of three alternating voltages of the same frequency and at least two having the same amplitude, the phase angle of the third voltage bisecting that formed between said two voltages, means for applying said third voltage to the grid of said third tube, means for applying said two voltages to the cathodes of said pair of tubes, respectively, and test terminals in series with the plate to cathode circuit of said third tube adapted to connect therebetween an impedance network to be tested.

7. In a testing circuit, a pair of vacuum tubes each having an input circuit and an output circuit, a direct-current indicator connected between the output circuits and responsive to the difference in currents flowing therein, a third vacuum tube having an input circuit and an output circuit, a source of three voltages of substantially the same frequency and at least two having the same amplitude, the phase angle of the third voltage bisecting the angle formed between said two voltages, means for applying said third voltage to the input circuit of said third tube, means for applying said two voltages to the input circuits, respectively, of said pair of tubes, means for applying the potential across at least a portion of the output circuit of said third tube to each input circuit of said pair of tubes, and test terminals in series with the output circuit of said third tube adapted to receive therebetween an impedance to be tested.

CHARLES E. DENNIS.

REFERENCES CITED

The following references are of record in the file of this patent:

UNITED STATES PATENTS

| Number | Name | Date |
| --- | --- | --- |
| 1,919,538 | Stone | July 25, 1933 |
| 2,179,048 | Miller | Nov. 7, 1939 |
| 2,307,319 | Koehler | Jan. 5, 1943 |
| 2,320,175 | Dennis et al. | May 25, 1943 |